(12) United States Patent
Bales (10) Patent No.: US 10,828,718 B2
(45) Date of Patent: Nov. 10, 2020

(54) INSTALLATION OF WATERJET VENT HOLES INTO VERTICAL WALLS OF CAVITY-BACK AIRFOILS

(71) Applicant: United Technologies Corporation, Farmington, CT (US)

(72) Inventor: Daniel A. Bales, Avon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 239 days.

(21) Appl. No.: 16/008,413

(22) Filed: Jun. 14, 2018

(65) Prior Publication Data
US 2019/0383145 A1 Dec. 19, 2019

(51) Int. Cl.
*B23K 15/00* (2006.01)
*B23P 15/04* (2006.01)

(52) U.S. Cl.
CPC .......... *B23K 15/0053* (2013.01); *B23P 15/04* (2013.01); *F05D 2230/10* (2013.01); *F05D 2230/233* (2013.01); *F05D 2230/234* (2013.01)

(58) Field of Classification Search
CPC . F01D 5/18; F01D 5/181; F01D 5/188; F01D 5/189; Y10T 29/49339; Y10T 29/49341
See application file for complete search history.

(56) References Cited

U.S. PATENT DOCUMENTS

| | | | | |
|---|---|---|---|---|
| 2,427,853 A | * | 9/1947 | Goodlett | B64C 3/00 244/123.2 |
| 5,222,617 A | * | 6/1993 | Gregory | B23K 26/18 219/121.71 |
| 5,584,660 A | * | 12/1996 | Carter | B23P 15/04 29/889.72 |
| 5,772,397 A | * | 6/1998 | Morris | F01D 5/187 415/115 |
| 5,820,337 A | * | 10/1998 | Jackson | C22C 32/00 415/200 |
| 6,611,731 B2 | | 8/2003 | Duffin | |
| 7,021,899 B2 | * | 4/2006 | Ferte | B23K 20/122 29/889.72 |
| 7,189,064 B2 | * | 3/2007 | Helder | B23K 20/122 416/232 |
| 7,841,084 B2 | * | 11/2010 | Meier | B23K 26/18 29/889.2 |
| 8,007,237 B2 | | 8/2011 | Sreekanth et al. | |
| 8,083,489 B2 | * | 12/2011 | Viens | F04D 29/388 416/229 R |
| 8,096,768 B1 | * | 1/2012 | Liang | F01D 5/187 416/97 R |
| 8,317,474 B1 | * | 11/2012 | Liang | F01D 5/188 416/97 R |
| 8,961,134 B2 | * | 2/2015 | Beeck | F01D 5/145 416/97 R |
| 9,200,521 B2 | * | 12/2015 | Bunker | F01D 5/18 |
| 9,415,468 B2 | * | 8/2016 | Hu | B23K 26/389 |

(Continued)

*Primary Examiner* — Jason L Vaughan
(74) *Attorney, Agent, or Firm* — Carlson, Gaskey & Olds, P.C.

(57) ABSTRACT

A method of manufacturing an airfoil includes creating a plurality of cavities separated by a plurality of internal ribs in an airfoil forging. At least one hole is drilled in at least one of the plurality of internal ribs with a waterjet drilling tool. At least one hole extends perpendicularly to a wall of the rib.

15 Claims, 6 Drawing Sheets

(56) References Cited

U.S. PATENT DOCUMENTS

| | | | | |
|---|---|---|---|---|
| 9,528,381 B2* | 12/2016 | Wassynger | ............... | F01D 5/187 |
| 9,562,436 B2* | 2/2017 | Bunker | ................... | B05D 7/50 |
| 9,676,046 B2 | 6/2017 | Hamada et al. | | |
| 9,739,155 B2* | 8/2017 | Smith | ..................... | F01D 5/187 |
| 9,776,284 B2 | 10/2017 | Hu et al. | | |
| 9,828,915 B2* | 11/2017 | Miranda | ................... | F02C 7/18 |
| 9,884,403 B2 | 2/2018 | Maurer | | |
| 9,897,006 B2* | 2/2018 | Miranda | ................. | F01D 5/187 |
| 10,329,919 B2* | 6/2019 | Vargas | ................... | B22D 25/02 |
| 2004/0064930 A1* | 4/2004 | Gunn | ..................... | B26F 3/008 |
| | | | | 29/421.1 |
| 2008/0308610 A1* | 12/2008 | Watson | ............... | B23K 33/004 |
| | | | | 228/112.1 |
| 2011/0076405 A1 | 3/2011 | Raji et al. | | |
| 2013/0315710 A1* | 11/2013 | Kollati | ................... | F01D 5/181 |
| | | | | 415/116 |
| 2014/0302278 A1* | 10/2014 | Bunker | ................. | B05D 3/002 |
| | | | | 428/137 |

* cited by examiner

INSTALLATION OF WATERJET VENT HOLES INTO VERTICAL WALLS OF CAVITY-BACK AIRFOILS

BACKGROUND

This disclosure relates to gas turbine engines and more particularly to an improved hollow fan blade for a gas turbine engine and method and tool for making the same.

A gas turbine engine typically includes a fan section, a compressor section, a combustor section, and a turbine section. Air entering the compressor section is compressed and delivered into the combustion section where it is mixed with fuel and ignited to generate a high-temperature and pressure gas flow. The hot gas flow expands through the turbine section to drive the compressor and the fan section. The fan section includes a rotor assembly and a stator assembly. The rotor assembly of the fan includes a rotor disc and plurality of radially extending fan blades. Fan blades are used to direct air into the engine, and typically have an airfoil shape that includes a twist from the root of the blade to the tip of the blade.

In order to reduce weight, the fan blades in some gas turbine engines are hollow. Historically, each fan blade is made by combining two separate detail halves. Each half may include a plurality of cavities and ribs machined out to reduce the weight. These halves are subsequently bonded together to form the hollow fan blade. The hollow fan blade is then subjected to forming operations at extremely high temperatures at which time it is given an airfoil shape and geometry. During the forming operation, the two halves are twisted and cambered under high temperatures to the desired shape. This process for producing a hollow fan blade can be time-consuming and expensive. The process described hereafter pertains to a lower cost and simplified method of producing a hollow fan blade.

SUMMARY

In one exemplary embodiment, a method of manufacturing an airfoil includes creating a plurality of cavities separated by a plurality of internal ribs in an airfoil forging. At least one hole is drilled in at least one of the plurality of internal ribs with a waterjet drilling tool. At least one hole extends perpendicularly to a wall of the rib.

In a further embodiment of the above, a cover is joined to the forging to form a complete airfoil.

In a further embodiment of any of the above, the joining comprises laser or electron beam welding around a periphery of the forging and along at least one of the internal ribs.

In a further embodiment of any of the above, a root hole is drilled in a root portion of the airfoil forging before the joining of the cover. The root hole is sealed before the airfoil is used in service.

In a further embodiment of any of the above, a protective fixture is inserted into one of the plurality of cavities opposite an internal rib from the drilling tool before the drilling of at least one hole.

In a further embodiment of any of the above, the protective fixture is metallic, ceramic or rubber.

In a further embodiment of any of the above, at least one hole is drilled at a midpoint of the internal rib between a floor of the forging and a top edge of the rib.

In a further embodiment of any of the above, at least one hole has a diameter of less than about 3/32 of an inch.

In a further embodiment of any of the above, the drilling is automated using a robotic controller.

In a further embodiment of any of the above, the forging comprises a titanium alloy.

In a further embodiment of any of the above, the airfoil is a fan blade for a gas turbine engine.

In a further embodiment of any of the above, the plurality of internal ribs comprises a plurality of circular ribs and a plurality of linear ribs connecting the circular ribs. The plurality of circular ribs have a greater height than a height of the linear ribs.

In another exemplary embodiment, a tool for machining an airfoil includes an elongated tool body that has a top end, a bottom end, and a sidewall that extends between the top end and the bottom end. A passage extends through the tool body from the top end to a curved portion near the bottom end. A pump is configured to provide a waterjet stream to the passage at the top end. The curved portion is configured to turn the waterjet stream at a right angle such that the waterjet stream exits the tool body through an aperture on the sidewall near the bottom end.

In a further embodiment of any of the above, a rubber bumper is at the bottom end and is configured to abut a work piece during use.

In a further embodiment of any of the above, a robotic controller is configured to automatically operate the tool.

In a further embodiment of any of the above, a protective fixture is controlled by the robotic controller. The protective fixture is configured to be positioned on an opposite side of a wall to be drilled from the tool body.

In a further embodiment of any of the above, the tool body is cylindrical and the passage is oriented near the sidewall.

In a further embodiment of any of the above, the aperture is in the sidewall less than about 0.5 inches from the bottom end.

In a further embodiment of any of the above, the aperture is about 0.25 inches from the bottom end.

In another exemplary embodiment, an airfoil includes an airfoil body that has a tip end and a root end. A first side extends between the tip end and the root end. A plurality of internal ribs extend from the first side and form a plurality of internal cavities. A hole extends through at least one of the internal ribs in a direction parallel to the first side. A cover is welded to at least some of the plurality of internal ribs.

BRIEF DESCRIPTION OF THE DRAWINGS

The disclosure can be further understood by reference to the following detailed description when considered in connection with the accompanying drawings.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
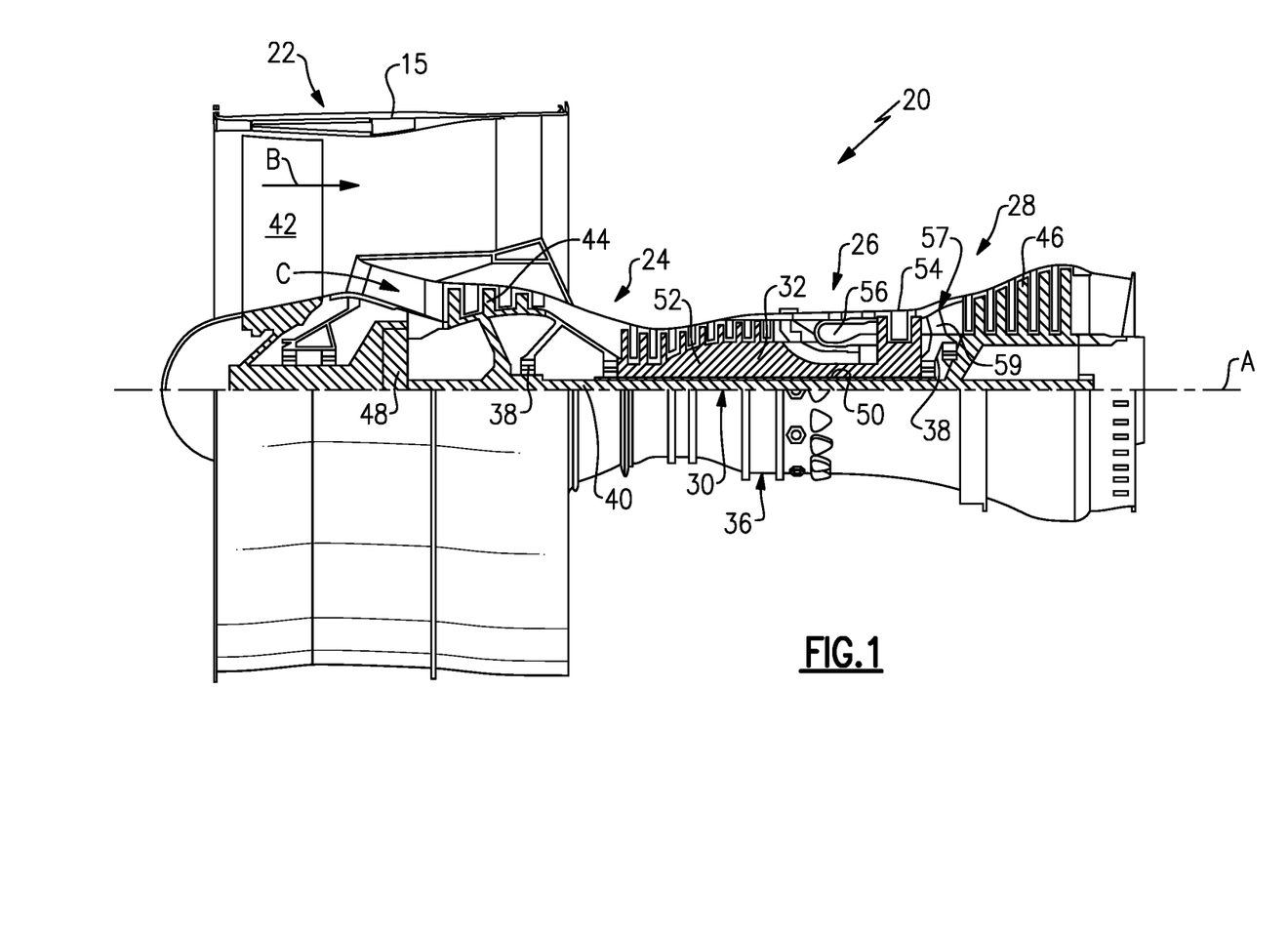
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to the inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

The fan section 22 comprises a fan case containing a rotor assembly. The rotor assembly includes a rotor disk and a plurality of fan blades. Each fan blade extends radially outwardly from the rotor disk into proximity with the fan case. The fan blades are hollow fan blades having a plurality of pockets. These hollow fan blades may be constructed in two halves. The pockets in the fan blades remove a significant amount of material from the fan blade, which decreases the weight of the fan section 22. A blade skin or cover is attached to the fan blade to seal the pockets. Details of the hollow fan blade and a method and tool for manufacturing are set forth more fully herein.

Figure 2:
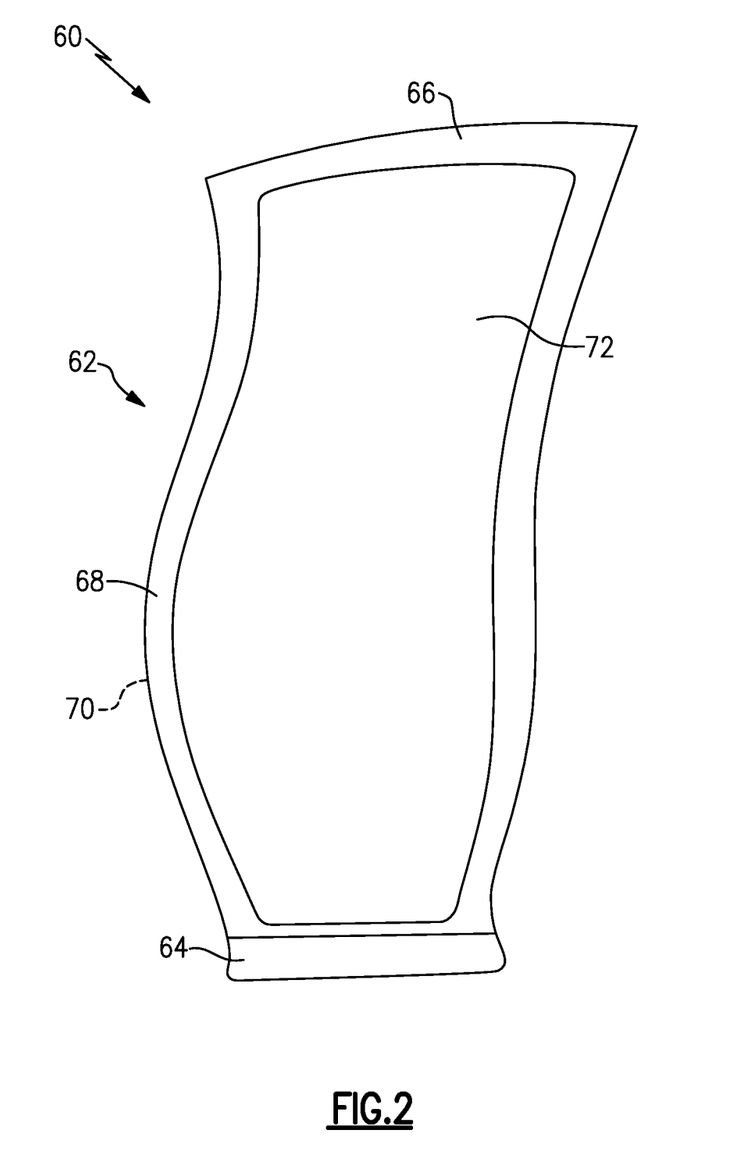
FIG. 2 is a view of a fan blade having a forging as an airfoil body.

FIG. 2 is a view of a fan blade 60 having a forging as an airfoil body 62. The airfoil body 62 has a root end 64 and a tip end 66. The airfoil body 62 has a twisted airfoil shape. In some embodiments, the airfoil body 62 may twist about 60 degrees from the root end 64 to the tip end 66. The thickness of the airfoil body 62 may vary, with the thickest portion being at the root end 64. The airfoil body 62 has a first side 68 that extends from the root end 64 to the tip end 66, and a second side 70 that extends from the root end 64 to the tip end 66. The airfoil body 62 may include a cover 72 attached to the first side 68 by laser or electron beam welding.

The cover 72 is very thin, and may be superplastic formed from a flat piece of titanium sheet metal. In one embodiment, the cover 72 may be between about 0.040 inches and about 0.080 inches. The cover 72 is attached to the fan blade 60 such that an exterior surface of the cover 72 is about flush with the exterior surface of the first side 68. The cover 72 is attached to the airfoil body 62 by laser or electron beam welding at its periphery and/or through the cover 72. Details of the welding of the cover are found in co-pending U.S. patent application Ser. No. 15/670,654, entitled "Power Beam Welded Cavity-Back Titanium Hollow Fan Blade," filed on Aug. 7, 2017, the entirety of which is herein incorporated by reference.

Figure 3:
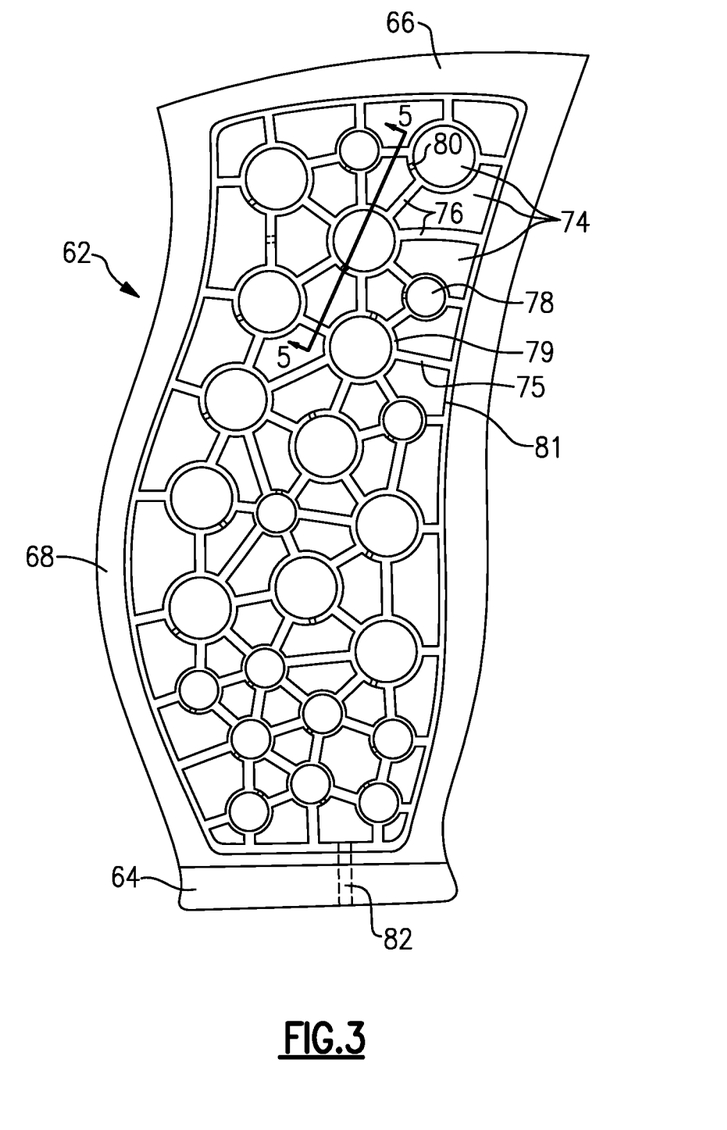
FIG. 3 is a view of the fan blade having a machined forging as an airfoil body of FIG. 2 without a cover.

FIG. 3 is a view of the twisted airfoil body 62 with cavities machined, but without the cover 72. In order to reduce weight while still maintaining the necessary stiffness and strength, a plurality of cavities 74 are machined into the interior surface of the airfoil body 62. The cavities 74 form a plurality of intersecting ribs 76. The ribs 76 are oriented in order to provide stiffness where needed during use of the engine 20. In one embodiment, the ribs 76 have a generally constant width. The ribs 76 help carry the load on the fan blade 60. In the illustrated embodiment, several of the cavities 74 are circular cavities 78. The ribs 76 surrounding the circular cavities 78 are circular ribs 79, and the ribs 76 connecting the circular ribs 79 to each other or to the periphery 81 of the airfoil body 62 are linear ribs 75. Although a circular rib configuration is illustrated, this disclosure may extend to other cavity configurations, such as rectangular cavities.

The cavities 74 are fluidly connected via a crossover hole 80. The hole 80 is drilled in the rib 76. In some embodiments, a crossover hole 80 connects each of the cavities 74. In another embodiment, each circular rib 79 has a crossover hole 80. Each of the cavities 74 are fluidly connected such that gases can travel between the cavities 74 and out through the root end 64 at a root hole 82.

Figure 5:
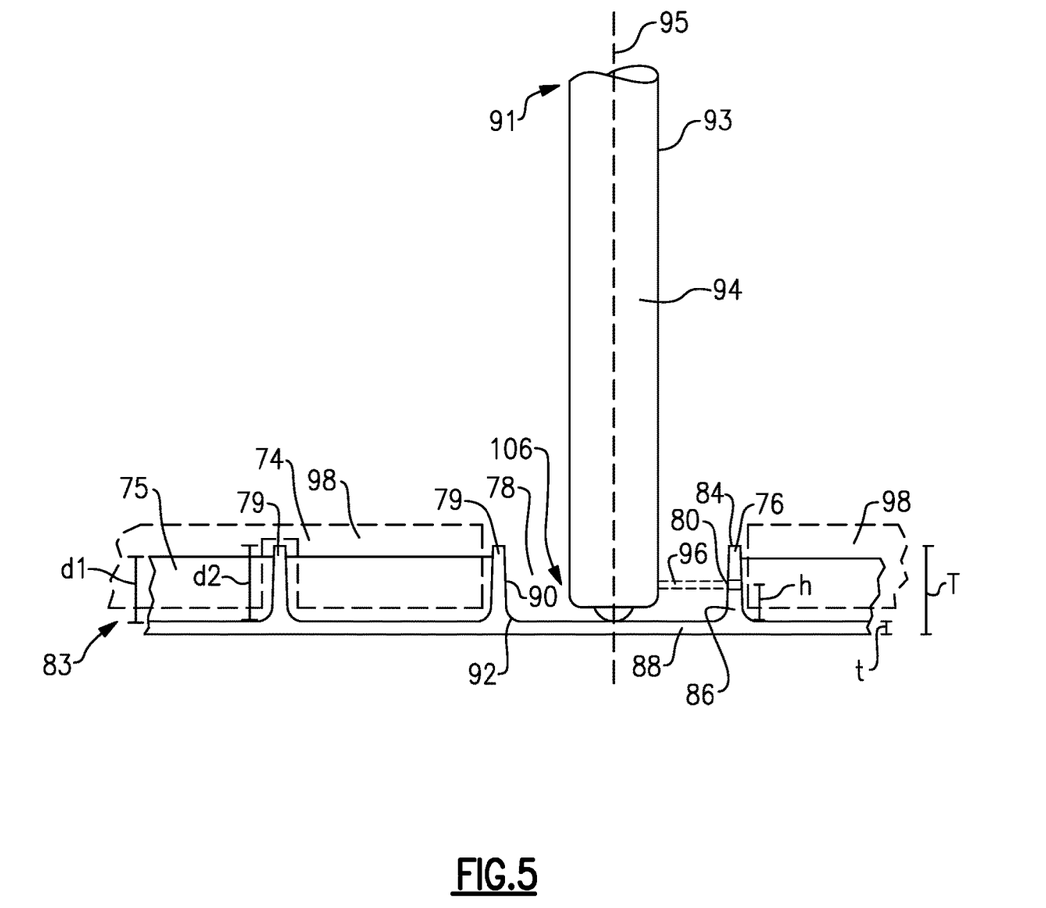
FIG. 5 shows a sectional view along line 5-5 of the fan blade of FIG. 2.

In some embodiments, the circular ribs 79 have a different height d2 than a height d1 of the linear ribs 75 (shown in FIG. 5). For example, the circular ribs 79 have a greater height d2 than the height d1 of the linear ribs 75. In these embodiments, only the circular ribs 79 need a hole 80. When the cover 72 is attached, it will abut the taller circular ribs 79, leaving a gap between the cover 72 and the shorter linear ribs 75. Thus, gases will be able to travel between adjacent cavities 74 in the space between the cover 72 and the linear ribs 75. In such a configuration, only a single crossover hole 80 is needed on each circular rib 79, to allow for gas communication between all of the cavities 74 and the root hole 82.

In one example, the cover 72 is attached to the airfoil body 62 by laser or electron beam welding around the periphery 81 of the airfoil body 62. In another example, the cover 72 is attached to the airfoil body 62 by laser or electron beam welding through the cover 72 and onto the ribs 76. In a further example, the cover 72 is attached to the airfoil body 62 by welding around the periphery 81 of the airfoil body 62 and along the circular ribs 79. Welding around both the periphery 81 and the circular ribs 79, rather than just around the periphery 81, may provide improved fatigue characteristics for the fan blade 60. Welding around the circular ribs 79, rather than along a linear rib, may provide a more consistent weld, because a circular weld may have fewer defects at the start and end of the weld because it provides an opportunity to go back over the starting point.

The welding of the cover 72 to the airfoil body 62 may be done in an Argon environment to help prevent contamination. However, when the airfoil body 62 is heated, the Argon expands. Crossover holes 80 are machined into the ribs 76 before the welding. In one embodiment, the crossover holes 80 have a diameter of less than about 0.0625 inches. In a further embodiment, the crossover holes 80 have a diameter between about 1/32 and 3/32 inches. These crossover holes 80 give the Argon a place to go when it expands at high temperatures. In other embodiments, the welding of the cover 72 may be done in a vacuum. In this example, when the airfoil body 62 is heated, the cavities 74 may collapse. The crossover holes 80 allow gas to flow into the cavities to equalize the pressure at high temperatures.

In an embodiment, there is one crossover hole 80 drilled into each of the circular ribs 79 and a root hole 82 located near the root end 64. The root hole 82 allows pressure inside the airfoil body 62 to equalize during a heat treat cycle by allowing gas to exit the fan blade 60 through the root. Each cavity 74 is thus in gas communication with an adjacent cavity, and one cavity is in communication with a root of the blade 60. This pressure equalizing helps prevent bulging of the internal cavities at high temperatures due to gas expansion.

Figure 4:
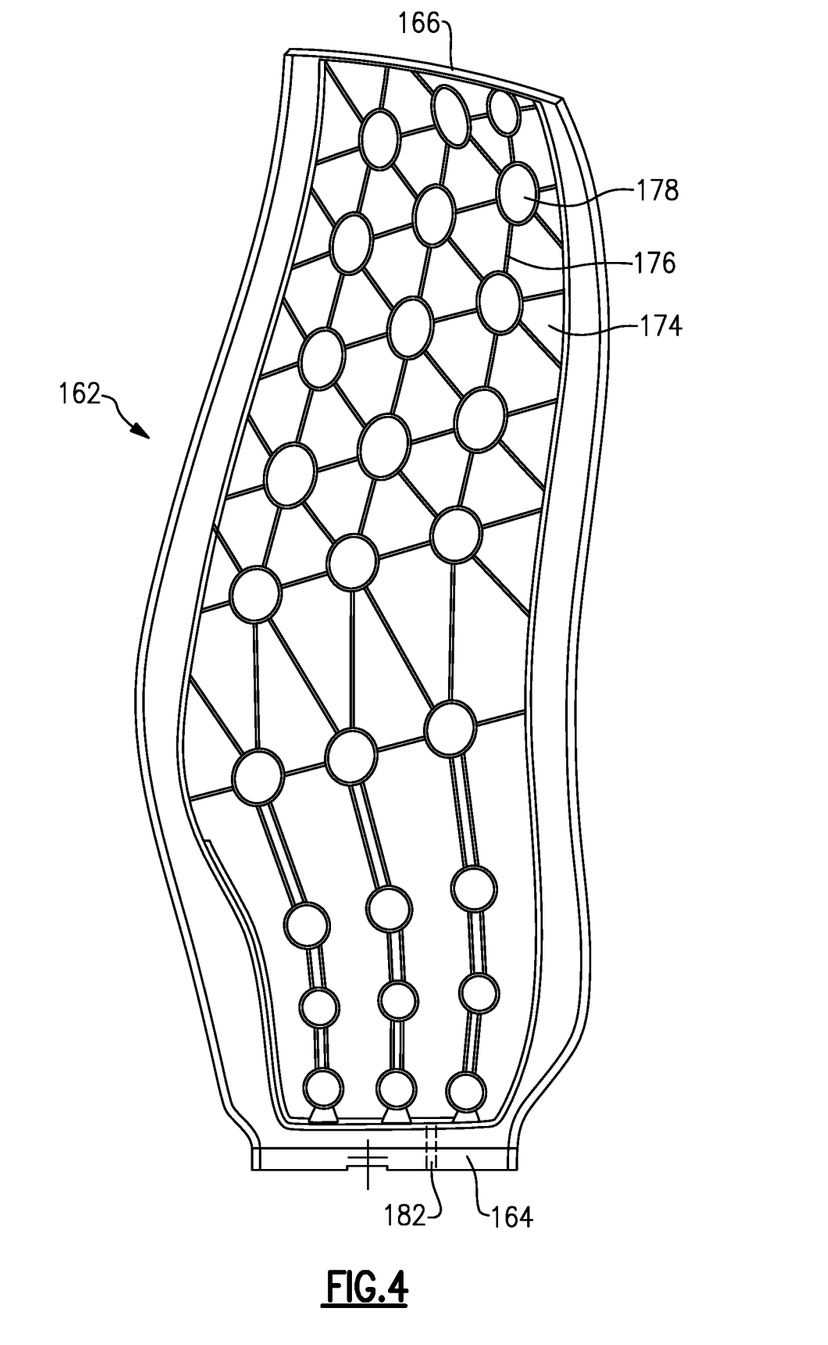
FIG. 4 is another example of a fan blade having a machined forging as an airfoil body.

FIG. 4 illustrates another example airfoil body 162. In this disclosure, like reference numerals designate like elements where appropriate and reference numerals with the addition of one-hundred or multiples thereof designate modified elements that are understood to incorporate the same features and benefits of the corresponding original elements. In this embodiment, several cavities 174 in the lower half of the airfoil body 162 near the root end 64 are larger cavities. All of the circular cavities 176 in the upper half of the airfoil body 162 near the tip end 166 are the same size. This embodiment may have the same configuration of crossover holes in each circular rib.

FIG. 5 illustrates a cross-sectional view along line 5-5 of FIG. 3. The airfoil body 62 is machined from a twisted fan blade forging 83 to have cavities 74 and ribs 76. In one non-limiting example, the forging 83 is about 30 inches long by about 12 inches wide and may have a mid-chord thickness T of about 1 inch. The forging 83 may be a titanium alloy, for example.

The cavities 74 are machined by removing material from the forging 83. The cavities 74 may be formed by milling, for example. This removing of material to form the cavities 74 also forms the ribs 76. Each rib 76 has an upper end 84 and a lower end 86. Each cavity 74, 78 has a floor 88 at the lower end 86 of the rib 76. The floor 88 extends between opposite wall interior surfaces 90, some of which define the ribs 76. Each cavity 74, 78 further includes a radius transition 92 between the wall interior surface 90 and the floor 88. The cavities 74, 78 may extend from about ¼ inch to more than 1 inch to the floor 88. The floor 88 may have a thickness t of about ⅛ inch thick. In a further embodiment, the floor 88 may be about 0.060 inches thick. The floor 88 forms a thin outer wall of the airfoil 62. The circular cavities 78 may be about 1.5 inches in diameter. In some embodiments, the ribs 76 may be machined to have different heights. In one example embodiment, the circular ribs 79 have a greater height d2 than the height d1 of the linear ribs 75.

Once a rib 76 is machined, a crossover hole 80 may be drilled in the rib 76. The crossover holes 80 are drilled in the rib 76 at a height h from the floor 88. In one embodiment, the height h is about half of the height d2 of the rib 76. In another embodiment, the crossover hole 80 is drilled in the rib 76 near the floor 88. If the holes 80 are near a top surface of the ribs 76, such as a notch in the rib, there may be a weak spot in the weld at that location once the cover 72 is attached. The holes 80 may be drilled at a neutral axis of the blade 60, for example. In some embodiments, the interior surfaces of the cavities 74 include a coating that provides protection of adjacent surfaces when laser or electron beam welding. In a further embodiment, the coating is a polyimide or similar coating.

The crossover hole 80 is drilled such that it extends completely through the rib 76 to an adjoining cavity 74. The crossover hole 80 is parallel to a floor 88 of the forging 83, or perpendicular to the rib 76. This perpendicular orientation allows for the hole 80 to be located on a neutral axis of the blade 60. A perpendicular hole 80 further prevents high stress concentrations at the sharp angles created by an angled hole. Such angled holes raise stress in the blade at that spot, particularly during fatigue conditions.

A tool 94 is used to drill the holes 80 into the ribs 76. The tool 94 includes a tool body having a top end 91, a bottom end 106, and a sidewall 93 extending between the top and bottom ends 91, 106. The tool 94 may be a rod-shaped tool extending along a tool centerline 95. Known drills typically use drill bits, making it difficult to drill a crossover hole 80 that is perpendicular to the rib 76. The tool 94 uses a waterjet stream 96 directed at a 90 degree angle from the tool centerline 95. This 90 degree turn of the waterjet stream 96 allows the tool 94 to be inserted into the cavity 78, and to drill a hole 80 that is perpendicular to the rib 76. A protective fixture 98 is positioned on the opposite side of the rib 76 being drilled. The protective fixture 98 acts as a stopper for the waterjet stream 96 to prevent the waterjet stream 96 from drilling into other ribs 76 and to collect any debris.

Figure 6:
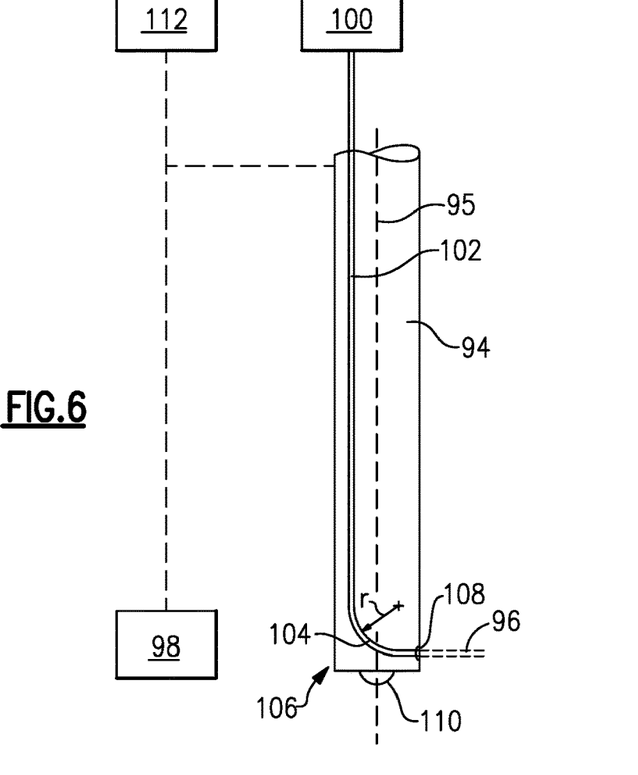
FIG. 6 schematically illustrates an exemplary tool for manufacturing an airfoil.

FIG. 6 illustrates a cross-sectional view of the tool 94. The tool 94 includes a high pressure water pump 100 for supplying the waterjet stream 96 to the rod-shaped tool 94. A passage 102 extends down the length of the tool 94. In an embodiment, the passage 102 is arranged near the sidewall 93 to allow a radiused turn 104. The passage 102 is arranged in order to allow the turn 104 to have the largest radius r possible while still making a 90 degree turn. After rounding the radiused turn 104, the waterjet stream 96 is directed out through an aperture 108 to the rib 76 that is being drilled. The aperture 108 is located in the sidewall 93 near the bottom end 106. In some embodiments, the aperture is less than 0.5 inches from the bottom end 106. In a further embodiment, the aperture is about 0.25 inches from the bottom end 106. In this embodiment, the hole 80 would be drilled at a height h of about 0.25 inches from the floor 88. The tool 94 further includes a bumper 110 at the bottom end 106. The bumper 110 abuts the floor 88 when the tool 94 is inserted into a cavity 74, 78. The bumper 110 may be rubber, for example, and prevents the tool 94 from scoring the floor 88. This prevents damage to the floor 88, which may result in stress concentrations in that area of the fan blade 60.

The waterjet stream 96 may be water at extremely high pressures. For example the waterjet stream 96 may have pressures of between about 20,000 psi and about 90,000 psi. In a further embodiment, the waterjet stream 96 may have pressures of between about 30,000 to 50,000 psi. The waterjet stream 96 may be water or may be a mixture of water and an abrasive grit, such as garnet, aluminum oxide, or silicon carbide. The tool 94 must be manufactured of a material that is capable of surviving the abrasive water flowing through the passage 102 and turn 104. The tool 94 may be manufactured from a ceramic powdered product such as silicon nitride, high strength cast superalloys, sapphire, or additive manufactured metals. The material must be capable of being produced with a smooth, curvaceous interior passage 102 that will hold up with minimal wear over time. Alternatively, the tool 94 may be manufactured from materials which can be produced in a green state and subsequently hot isostatically pressed, sintered, and/or heat treated to provide a highly abrasive-resistant tool 94.

The tool 94 is controlled by a controller 112, shown schematically. In an embodiment, the controller 112 is a robotic controller using computer numerical control. The robotic controller 112 may be trained by imputing positioning coordinates, the tool's rotational orientation about the centerline 95, the power and time, and the sequence for drilling each hole. Data may be loaded into the controller 112 such that either or both the fixture 98 and tool 94 would be articulated to drill a through-wall hole of proper diameter at a midpoint within each cavity's adjacent wall. The controller 112 may be programmed to move the tool 94 sequentially from one cavity to another to waterjet drill a crossover hole 80 in each cavity's vertical rib 76. The controller 112 may be programmed such that it drills all of the crossover holes 80 in an airfoil body 62 in less than about 45 minutes. In a further embodiment, the controller 112 may be programmed to drill all of the crossover holes 80 in an airfoil body 62 in between about 10 minutes and about 30 minutes.

Concurrently with the tool's movement into position, the protective fixture 98 would automatically move into position to provide a backstop for preventing back strikes from occurring on an adjacent cavity's walls. The protective fixture 98 helps prevent impingement of abrasive grit and titanium particles on the inside floor 88 of the cavity 74 or onto ribs 76. In some embodiments, the protective fixture 98 has a circular contour to allow it to be positioned close to a circular rib 79. The protective fixture 98 may include a recess positioned near the rib 79 to catch material that is blasted through the hole 80 from the tool 94. The protective fixture 98 may be made from metal or a non-metallic such as rubber or ceramic, for example. The protective fixture 98 may be about 0.5 inches in width by about 0.75 inches in height, in one example. The protective fixture 98 may also be controlled by the controller 112. The controller 112 may be programmed to sequentially move the protective fixture 98 from one cavity to the next along with the tool 94 to waterjet drill crossover holes 80 in each cavity that needs one.

Figure 7:
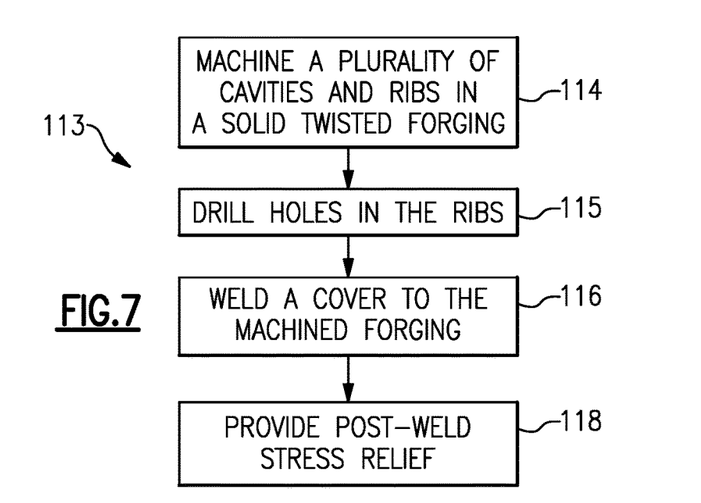
FIG. 7 schematically illustrates a method for manufacturing an airfoil.

An example method of manufacturing an airfoil is summarized in the flowchart of FIG. 7. First, a plurality of cavities 74 and ribs 76 are machined into a twisted fan blade forging 83 at step 114. In an embodiment, the forging 83 is a titanium alloy. Next, crossover holes 80 are drilled into the ribs 76 at step 115. In an example embodiment, at least some of the cavities 74 are circular cavities 78 surrounded by circular ribs 79. The crossover holes 80 are drilled with a waterjet drill tool 94, such that the crossover holes 80 extend perpendicular to the rib 76. These crossover holes 80 allow for gas communication between adjacent cavities 74. In an embodiment, a root hole 82 is also drilled near a root end 64 of the machined forging 83.

After the cavities 74 and ribs 76 are machined, and the crossover holes 80 are drilled, a cover 72 is welded onto the machined forging 83 at step 116. The welding 116 of the cover 72 to the airfoil body 62 may be done using laser welding in an Argon environment to help prevent contamination.

After the cover 72 has been welded onto the airfoil body 62 at step 116, the fan blade 60 is provided stress relief to reduce welding residual stresses at step 118. In some embodiments, the blade 60 goes through thermal processing with temperatures of up to about 1100 to 1600° F. Finally, the root hole 82 should be sealed before the airfoil 60 is used in service.

The crossover holes 80 that were drilled at step 115 allow pressure neutralization during the thermal processing at step 118 by allowing expanding gases, such as any Argon trapped in the cavities 74 from step 116, to flow into adjacent cavities 74 and exit the blade 60 through the root hole 82. This venting of the internal cavities through crossover holes 80 prevents the Argon gas from bulging the sealed internal cavities during thermal processing. The disclosed tool and method may allow titanium fan blades to be produced faster and at a lower cost.

It should also be understood that although a particular component arrangement is disclosed in the illustrated embodiments, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing an airfoil, comprising:
   creating a plurality of cavities separated by a plurality of internal ribs in an airfoil forging;
   drilling at least one hole in at least one of the plurality of internal ribs with a waterjet drilling tool, wherein the at least one hole extends perpendicularly to a wall of the rib;
   joining a cover to the forging to form a complete airfoil, wherein the joining comprises laser or electron beam welding around a periphery of the forging and along at least one of the internal ribs; and
   drilling a root hole in a root portion of the airfoil forging before the joining of the cover; sealing the root hole before the airfoil is used in service.

2. The method of claim 1, comprising:
   inserting a protective fixture into one of the plurality of cavities opposite an internal rib from the drilling tool before the drilling of the at least one hole.

3. The method of claim 2, wherein the protective fixture is metallic, ceramic or rubber.

4. The method of claim 1, wherein the at least one hole is drilled at a midpoint of the internal rib between a floor of the forging and a top edge of the rib.

5. The method of claim 1, wherein the at least one hole has a diameter of less than about $3/32$ of an inch.

6. The method of claim 5, wherein the diameter is greater than $1/32$ of an inch.

7. The method of claim 1, wherein the drilling is automated using a robotic controller.

8. The method of claim 1, wherein the forging comprises a titanium alloy.

9. The method of claim 1, wherein the airfoil is a fan blade for a gas turbine engine.

10. The method of claim 1, wherein the plurality of internal ribs comprises a plurality of circular ribs and a plurality of linear ribs connecting the circular ribs, and wherein the plurality of circular ribs have a greater height than a height of the linear ribs.

11. The method of claim 10, wherein the laser or electron beam welding is done along at least one of the plurality of circular ribs.

12. The method of claim 1, wherein at least some of the plurality of ribs are hollow circular ribs.

13. The method of claim 1, wherein the plurality of ribs have a constant width.

14. The method of claim 1, comprising drilling a plurality of holes in the plurality of ribs such that each of the cavities is fluidly connected to the root hole.

15. The method of claim 1, wherein the laser or electron beam welding is done in an argon environment.

* * * * *